US005404155A

United States Patent [19]

Kitamura

[11] Patent Number: 5,404,155

[45] Date of Patent: Apr. 4, 1995

[54] IMAGE FORMING APPARATUS HAVING AN APERTURE ELECTRODE WITH CONTROLLED IMAGE POTENTIAL

[75] Inventor: Tetsuya Kitamura, Gifu, Japan

[73] Assignee: Brother Kogyo Kabushiki Kaisha, Nagoya, Japan

[21] Appl. No.: 148,514

[22] Filed: Nov. 8, 1993

[30] Foreign Application Priority Data

Nov. 13, 1992 [JP] Japan .................................. 4-303470
Jan. 14, 1993 [JP] Japan .................................. 5-004744

[51] Int. Cl.⁶ .............................................. G01D 15/06
[52] U.S. Cl. ..................................... 347/151; 347/148
[58] Field of Search ................................ 355/261–265; 118/647–651; 346/153.1, 154, 155, 159

[56] References Cited

U.S. PATENT DOCUMENTS 3,689,935 9/1972 Pressman et al. .................... 346/159
5,128,695 7/1992 Maeda ............................. 346/159 X
5,214,451 5/1993 Schmidlin et al. .................. 346/159
5,229,794 7/1993 Honma et al. ...................... 346/154
5,231,427 7/1993 Ohashi ............................ 346/159 X
5,296,879 3/1994 Kagayama ......................... 346/159 X
5,311,266 5/1994 Maeda ................................ 355/261

*Primary Examiner*—William J. Royer
*Attorney, Agent, or Firm*—Oliff & Berridge

[57] ABSTRACT

The pulse width modulation circuit in the image forming apparatus of the invention comprises a discriminate circuit, an on-time control circuit, and an amplification circuit. The discriminate circuit determines whether an imaging potential or a non-imaging potential is applied to adjoining control electrodes. The on-time control circuit controls an applying time of the imaging potential to the control electrodes according to a result determined by the discriminate circuit, that is, according to the kind of potential applied to adjoining control electrodes. The amplification circuit amplifies the output from the on-time control circuit to a suitable control voltage which is sent to the control electrode. Therefore, it is possible to pass a predetermined amount of the toner particles through the desired aperture, even if the voltage applied by each control electrode is different. Moreover, a shield electrode may further be provided between the aperture electrodes of the present image forming apparatus to prevent an electric field from being generated between each control electrode.

18 Claims, 6 Drawing Sheets

IMAGE FORMING APPARATUS HAVING AN APERTURE ELECTRODE WITH CONTROLLED IMAGE POTENTIAL

BACKGROUND OF THE INVENTION

1. Field of the Invention

The invention relates to an image forming apparatus that is suitable for copying, printing, facsimile reproduction, and similar applications.

2. Description of Related Art

Conventionally, an image forming apparatus which is designed to form an image on a recording medium, by modulating particle flows of a toner through a plurality of apertures formed through a particle flow modulator, is known. The particle flows through the apertures are modulated by applying controlled electric potentials, that is an imaging potential and a non-imaging potential, to respective electrodes provided on the particle flow modulator according to image signals.

Described in detail, the particle flow modulator includes an insulating layer, a reference electrode formed on one of the surfaces of the insulating layer, and a segmented conductive layer formed on the other surface of the insulating layer. The segmented conductive layer consists of a plurality of control electrodes. The particle flow modulator has at least one row of apertures formed through the insulating layer and the continuous and segmented conductive layers, such that the apertures correspond to the respective control electrodes. The apparatus also includes voltage applying means for applying selected electric potentials between the reference electrode and each of the control electrodes; toner supply means for providing electrostatically charged toner particles so that flows of the charged toner particles through the individual apertures of the particle flow modulator are modulated by the applied electric potentials; and back electrode means, for positioning the recording medium in the path of the flows of the toner particles, which is provided on an opposite side of the particle flow modulator than the toner supply means. An example of such an image forming apparatus is disclosed in detail in U.S. Pat. No. 3,689,935.

However, in the conventional image forming apparatus thus structured, the amount of toner particles which pass through an aperture A, corresponding to one control electrode to which the imaging potential is applied, differs when an imaging potential is applied to the control electrode corresponding to an aperture B, adjacent to the aperture A, and when the applied potential to aperture B is a non-imaging potential. That is, when an imaging potential is applied to the control electrode of an aperture, the toner particles supplied to the areas surrounding the aperture are moved in the direction of the aperture by the electric field formed by the applied potential and the density of the toner particles in the surrounding areas becomes thin. Therefore, when the imaging potential is applied to the control electrode of the aperture B, the amount of toner particles which passes through the aperture A, adjacent to the aperture B, decreases.

On the other hand, when the non-imaging potential is applied to the control electrode of an aperture, the toner particles supplied to the areas surrounding the aperture are moved in the direction of the surrounding areas by the electric field formed by the applied potential and the density of the toner particles in the surrounding areas thickens. Therefore, when the non-imaging potential is applied to the control electrode of the aperture B, the amount of toner particles which passes through the aperture A, adjacent to the aperture B, increases. As a result, the edge portion of the aperture is emphasized and the image recorded on the recording medium becomes uneven.

In addition, in the conventional particle flow modulator, the tracks of the toner particles which fly to the image recording medium after passing through the aperture corresponding to the control electrode to which the imaging potential is applied differ according to the potential applied to the control electrode of the adjoining aperture, that is, whether an imaging potential or a non-imaging potential is applied. This difference is caused by the electric fields generated between the control electrodes adjacent to each other. As a result, the input image data cannot be faithfully recorded on the image recording medium.

SUMMARY OF THE INVENTION

An object of the invention is to provide an image forming apparatus capable of passing a predetermined amount of toner particles through a desired aperture, flying the toner particles which have passed through the aperture accurately to the image recording medium, and faithfully recording the desired image data, even if a different potential is applied to each control electrode.

In order to achieve the above object, the image forming apparatus of the invention provides an aperture electrode having a plurality of apertures with a control electrode provided around each aperture to which an imaging potential or a non-imaging potential is selectively applied such that the aperture electrode controls the passage of the toner particles through the apertures. Further, the image forming apparatus provides an electric field control means for preventing the generation of an electric field that causes the unevenness of the flow of the toner particles led from the toner particle supplying means into the image recording medium.

The electric field control means in the image forming apparatus of the invention controls the imaging potential applied to the control electrode corresponding to the aperture through which the toner particles are passed so that the waveform of the applied imaging potential may be different in the case where the imaging potential is applied to the control electrode corresponding to the adjoining aperture and the case where the non-imaging potential is applied thereto. Moreover, the electric field between each control electrode is prevented from being generated by a shield electrode further provided on the aperture electrode of the invention.

As explained above, according to the image forming apparatus of the invention, the electric field control means for controlling the imaging potential applied to the control electrode corresponding to the aperture through which the toner particles are passed is provided so that the waveform of the applied imaging potential may differ in the case where the imaging potential is applied to the control electrode corresponding to the adjoining aperture and in the case where the non-imaging potential is applied thereto. Thereby, even if a different potential is applied to each control electrode, it is possible to pass a predetermined amount of toner particles through a desired aperture in order to obtain an output image whose density is not uneven. Further, according to the image forming apparatus of the invention, as an unnecessary electric field is not formed between adjacent control electrodes, the toner particles which have passed through each aperture firmly reaches the image recording medium. Thus, it is possible to faithfully record the desired image data.

BRIEF DESCRIPTION OF THE DRAWINGS

A preferred embodiment of the invention will be described in detail with reference to the following figures wherein.

DETAILED DESCRIPTION OF THE PREFERRED EMBODIMENTS

Figure 1:
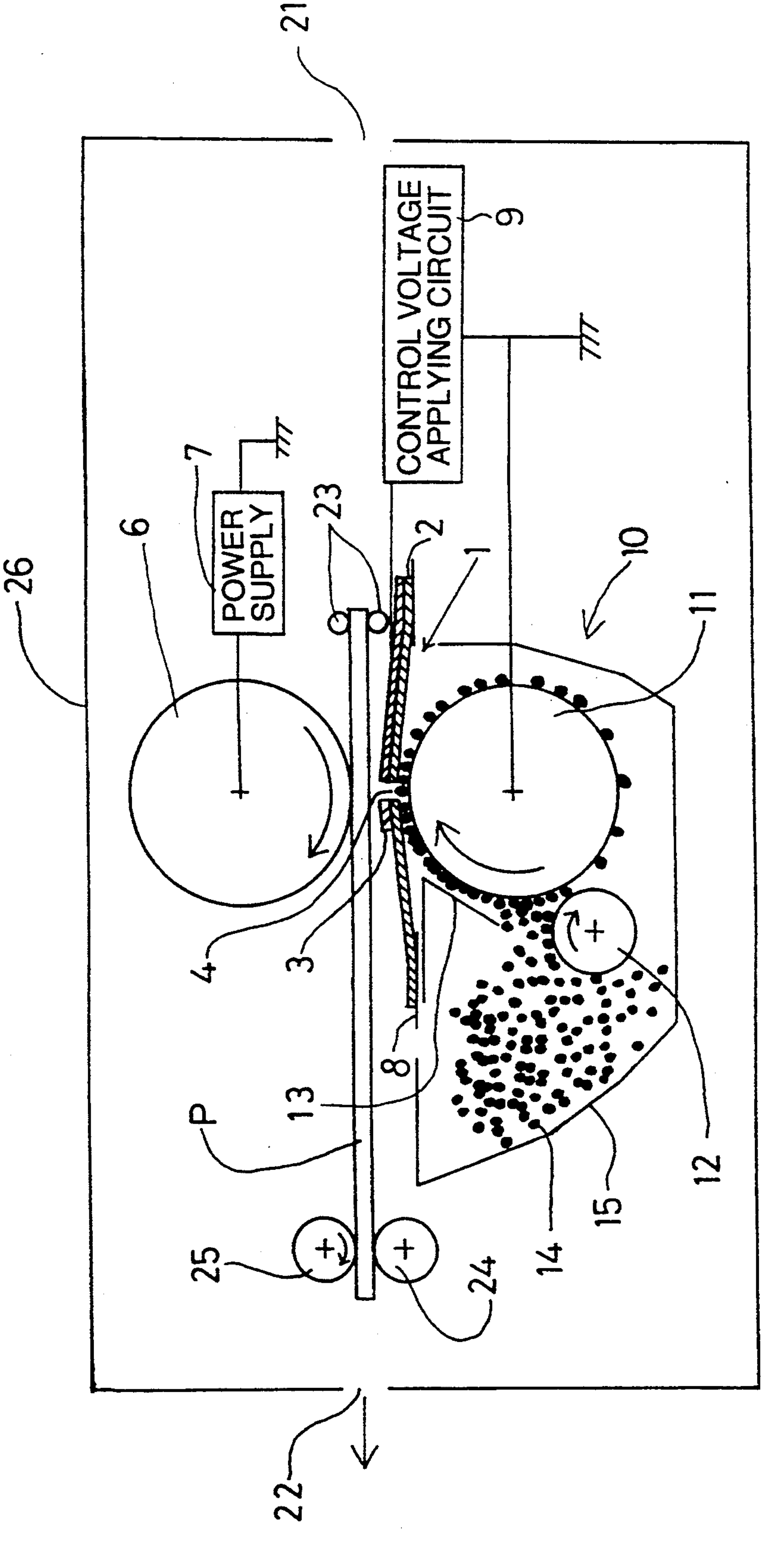
FIG. 1 is a fragmentary schematic view in elevation showing an image forming apparatus constructed according to one embodiment of the invention.
Figure 2:
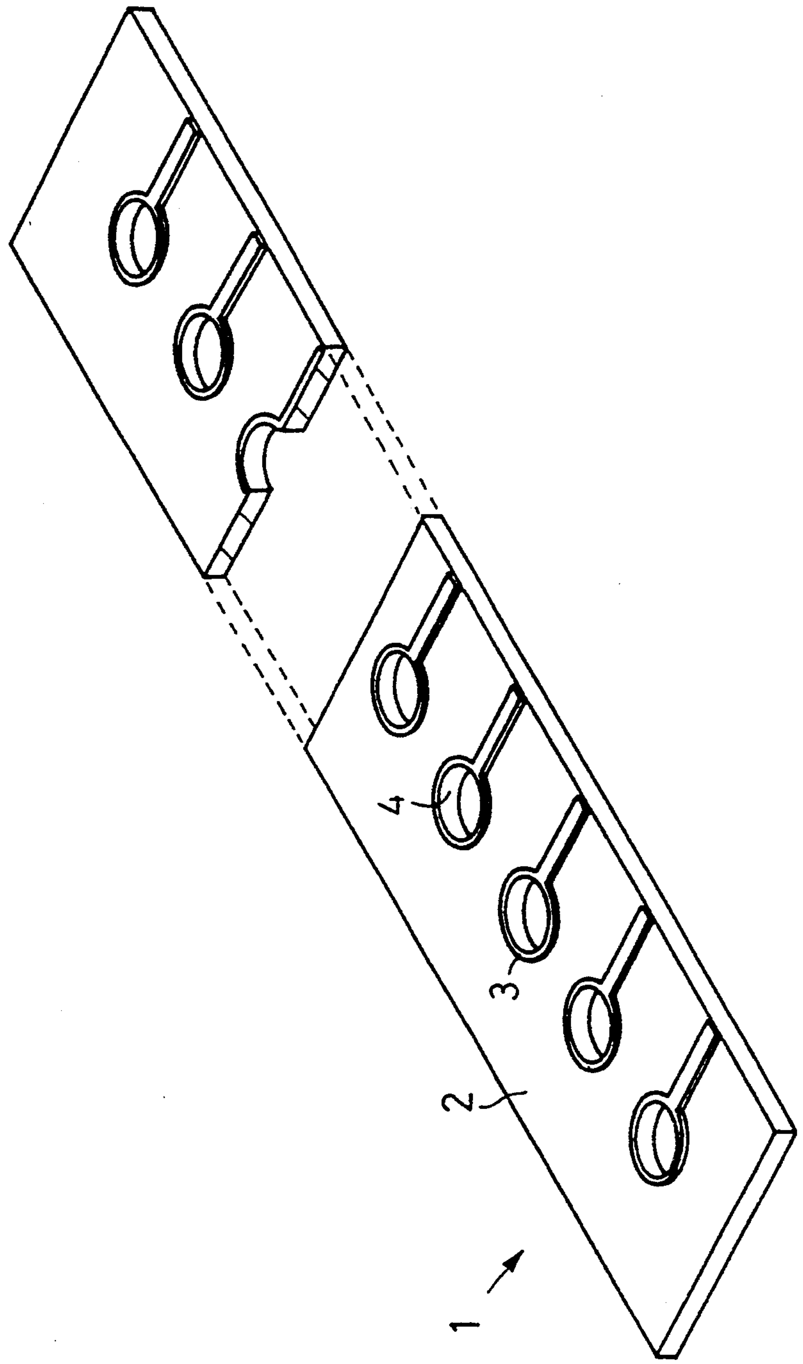
FIG. 2 is a perspective view showing in detail an aperture electrode used in the image forming apparatus of FIG. 1.

Referring first to FIGS. 1 and 2, an image forming apparatus according to the first embodiment of the invention includes a sheet inlet 21 and a sheet outlet 22 for an image recording medium P that are provided in each side of an outer frame 26, a particle-flow modulating electrode 1 (hereinafter referred to as "modulating electrode member"), a back electrode 6 in the form of a roller (hereinafter referred to as "back electrode roller"), and a toner particle supply device 10 that is provided inside of the outer frame 26. The modulating electrode member 1 is fixed by a stand 8.

The toner particle supply device 10 is provided under the modulating electrode member 1. The toner particle supply device 10 is covered with a toner particle casing 15 and includes a grounded rotatable toner particle carrying roller 11, a rotatable supplying roller 12, and a blade 13. Toner particles 14 are stored in the toner particle casing 15. The supplying roller 12 is disposed to hold the toner particles in pressing contact with the toner particle carrying roller 11 for supplying the toner particles 14 to the toner particle carrying roller 11 and for electrostatically charging the toner particles 14. The blade 13 is disposed to hold the toner particles 14 in pressing contact with the toner particle carrying roller 11. In addition, the toner particle carrying roller 11 is disposed to come into contact with the modulating electrode member 1 near the aperture 4 while holding the toner particles therebetween. The distance between the modulating electrode member 1 and the toner particle carrying roller 11 is very narrow and corresponds to the thickness of the toner particles 14 supported on the toner particle carrying roller 11. If the toner particles 14 are not supported on the toner particle carrying roller 11, then the toner particle carrying roller 11 comes into contact with the modulating electrode member 1 near the aperture 4.

The back electrode roller 6 is disposed opposite a surface of the modulating electrode member 1 away from the toner particle carrying roller 11. In addition, the back electrode roller 6 and the modulating electrode member 1 are spaced apart from each other by one millimeter and cooperate to partially define a feed path of the image recording medium P on which an image is formed. A voltage of plus one kilovolts is applied to the back electrode roller 6 by a power supply 7. By applying the voltage to the back electrode roller 6, the charged toner particles that have passed through at least one of the apertures 4 on the modulating electrode member 1, are attracted to the image recording medium P that is fed along the feed path by rotation of the back electrode roller 6 and the image is formed on the image recording medium P.

The image recording medium P that is inserted from the sheet inlet 21 into the inside of the device can be transferred from the sheet inlet 21 to the back electrode roller 6 by the operation of a pair of guide rollers 23,23. The image recording medium P, on which the image is formed by passing between the modulating electrode member 1 and the back electrode roller 6, is further passed between a heat roller 24 which has a heat source therein and a press roller 25. Thereby, the toner particle image formed on the image recording medium P is thermally fixed.

As shown in detail in FIG. 2, the above mentioned modulating electrode member 1 comprises an insulative layer 2; a single array of apertures 4 provided on the insulative layer 2, the apertures 4 spaced apart from each other in a direction parallel to the axis of the toner particle carrying roller 11; and a plurality of control electrodes 3 provided so that a control electrode 3 surrounds each aperture 4 on one surface of the modulating electrode member 1.

Figure 3:
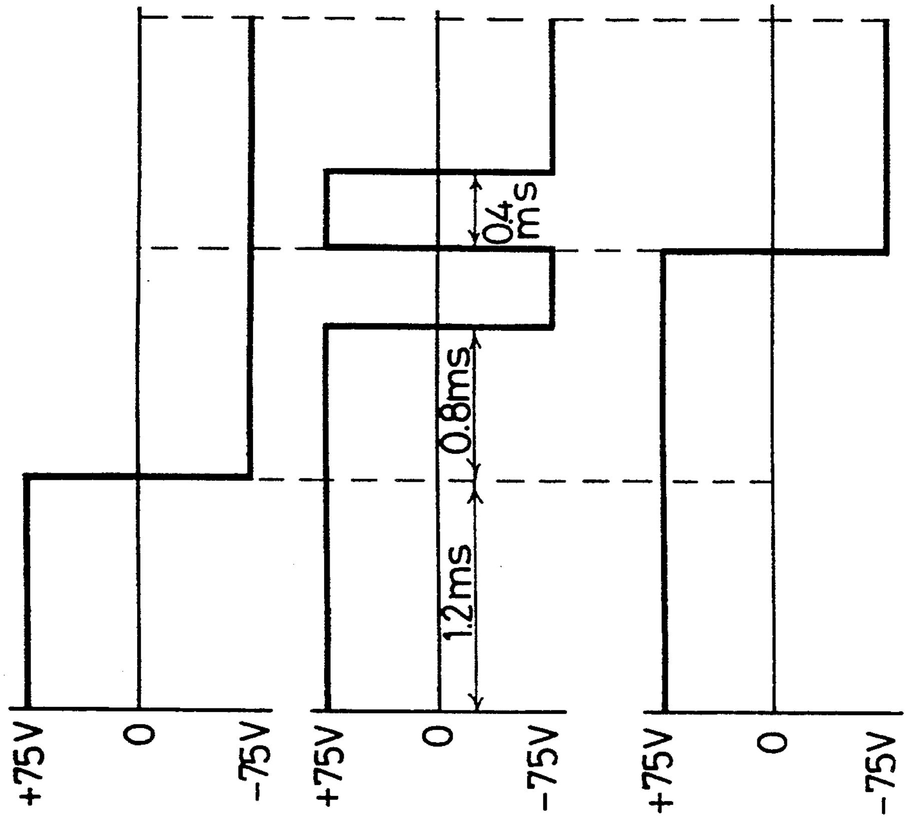
FIGS. 3A and 3B are an explanatory view of the control method of the imaging potential applied to the control electrode of the image forming apparatus of the invention.
Figure 3:
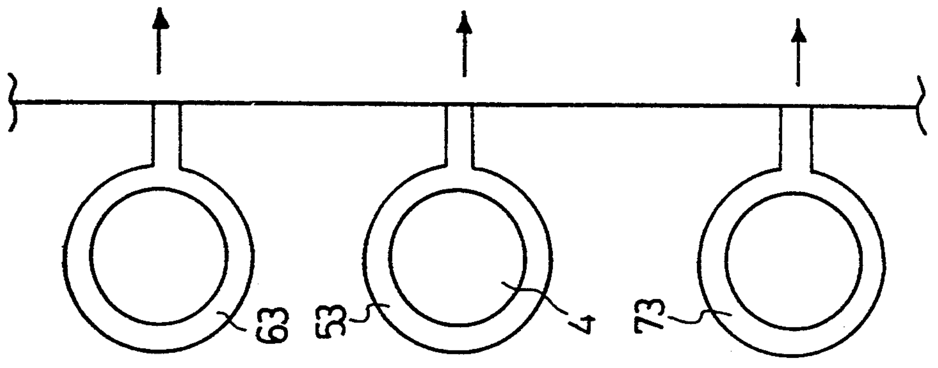

The insulative layer 2 is made of an a resin film such as a polyimide having about 25 μm thickness. The control electrodes 3 are formed of a suitable electrically conductive material, such as copper, by a well-known spattering method. Each aperture 4 penetrates through the insulative layer 2 and has a diameter of 80 μm, which is preferable when the recording of images having a resolution of 300 dpi is requested. Each control electrode 3 is connected to a control voltage applying circuit 9. According to the voltage applied to the adjoining control electrodes, the imaging potential having varying applying time is applied to one control electrode 3. As shown in FIG. 3(B), the applying time of the imaging potential applied to the control electrode 53 is controlled so that the applying time of the imaging potential applied to the control electrode 53 when the non-imaging potential is applied to both adjoining control electrodes 63,73 may be shorter than the case when the imaging potential is applied to the adjoining control electrodes 63,73.

Figure 4:
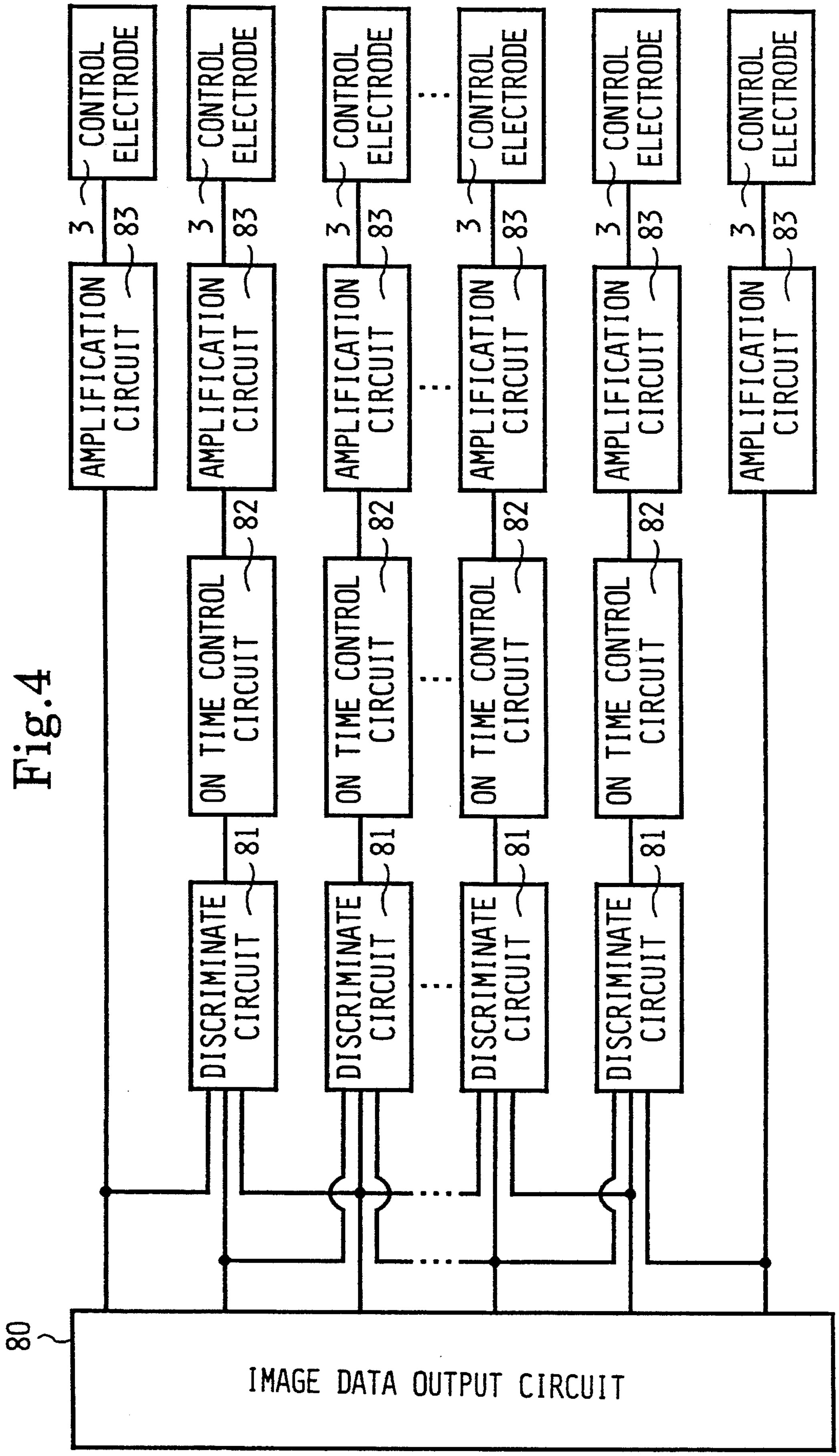
FIG. 4 is a block diagram showing the structure of a pulse width modulation circuit used for the image forming apparatus of the invention.

The pulse width modulation can be achieved by a circuit as shown in FIG. 4. The pulse width modulation circuit has a discriminate circuit 81, an on-time control circuit 82, and an amplification circuit 83. The discriminate circuit 81 takes a data output from an image data output circuit 80 for the adjoining control electrodes 3 and distinguishes whether the imaging potential is applied to the adjoining control electrodes 3 or the non-imaging potential is applied thereto. The on-time control circuit 82 controls the on-time, that is, the applying time of the imaging potential according to the result of the discrimination of the potential applied to the adjoining control electrodes 3 by the discriminate circuit 81. The amplification circuit 83 amplifies the data output from the on-time control circuit 82 to a suitable control voltage and sends it to the control electrodes 3.

Next, the operation of the image forming apparatus thus structured will be explained.

In the toner particle supply device 10, the toner particles 14 stored in the toner particle casing 15 are supplied to the toner particle carrying roller 11 by the supplying roller 12. At this time, the toner particles 14 are charged to a negative polarity by coming in contact with the supplying roller 12 and the toner particle carrying roller 11 and by being rubbed thereby. The charged toner particles 14 are transferred to the aperture 4 of the modulating electrode member 1 by the rotation of the toner particle carrying roller 11 past the blade 13. The toner particles 14, supported by the toner particle carrying roller 11, are made into a toner layer having a thin and even thickness by the operation of the blade 13.

The charged toner particles 14 having a negative polarity that are supplied to the aperture 4 of the modulating electrode member 1 are controlled in their passage through the aperture 4 corresponding to the control electrode 3 by the voltage applied from the control voltage applying circuit 9 to the electrode 3. More precisely, when a voltage of plus 75 volts is applied from the control voltage applying circuit 9 to the control electrode 3 as an imaging potential, an electric field is created, wherein the toner particles 14 charged with a negative polarity can pass through the aperture 4, between the grounded toner particle carrying roller 11 and the control electrode 3. That is, an attractive field is created inside of the aperture 4 corresponding to the control electrode 3. Thus, the toner particles 14 pass through the aperture 4. On the other hand, when a voltage of minus 75 volts is applied from the control voltage applying circuit 9 to the control electrode 3 as a non-imaging potential, an electric field is created, wherein the toner particles 14 charged with a negative polarity are prevented from passing through the aperture 4, between the grounded toner particle carrying roller 11 and the control electrode 3. That is, a repulsive field is created inside of the aperture 4 corresponding to the control electrode 3. Thus, the toner particles 14 do not pass through the aperture 4.

It was confirmed by experimentation that a larger amount of toner particles pass through the aperture corresponding to the control electrode 3 at the time when the non-imaging potential is applied to the control electrode 3 adjacent to the control electrode 3 to which the imaging potential is applied as compared with the time when the imaging potential is applied to the adjoining control electrode 3. This phenomenon occurs because an electric field is created that repulses the charged toner particle from the aperture corresponding to the control electrode 3 to which the non-imaging potential is applied. The toner particles 14 supplied to this non-imaging aperture 4 are moved to the circumference of the aperture 4. As a result, the density of the toner particle available or supplied to the neighboring apertures 4 becomes high.

For example, assuming that the amount of the toner particles 14 which pass through the aperture 4 when the imaging potential is applied to the adjoining control electrodes 3 on both sides is 1, the amount of toner particles 14 which pass through the aperture 4 increases to 1.5 when a non-imaging potential is applied to one of the adjoining control electrodes 3 and the amount of the toner particles 14 that pass through the aperture 4 increases to 3 when the non-imaging potential is applied to the adjoining control electrodes 3 on both sides of the imaging aperture 4.

In this embodiment of the invention, control electrode 3 of the invention, as shown in FIG. 3(B), the time for applying the imaging potential to a predetermined control electrode 3 is controlled according to the voltage applied to the adjoining control electrode 3. This voltage pulse width modulation is achieved by the circuit shown in FIG. 4. The amount of the toner particles 14 that pass through the aperture 4 is nearly proportional to the applying time of the imaging potential. As shown in FIGS. 3(A) and 3(B), when an imaging potential is applied to the adjoining control electrodes 63,73 on both sides of control electrode 53, the discriminate circuit 81 detects the application of the imaging potential to both adjoining control electrodes 63,73. The result is sent to the on-time control circuit 82 and the imaging potential is controlled so as to be applied for 1.2 milliseconds. The imaging potential is amplified by the amplification circuit 83 and the imaging potential of plus 75 volts is applied to the control electrode 53 during the 1.2 milliseconds. In the case where the imaging potential is applied to only one of the adjoining control electrodes, in this case control electrode 73, and a non-imaging potential is applied to the other adjoining control electrode 63, and such is determined by the discriminate circuit 81. The result is sent to the on-time control circuit 82 and the imaging potential is controlled to be applied during 0.8 milliseconds. The imaging potential is amplified by the amplification circuit 83 and the imaging potential of plus 75 volts is applied to the control electrode 53 for 0.8 milliseconds.

In the case where the non-imaging potential is applied to the adjoining control electrodes 63,73 on both sides of control electrode 53, when the discriminate circuit 81 so determines, the result is sent to the on-time control circuit 82 and the imaging potential is controlled to be applied for 0.4 milliseconds. The imaging potential is amplified by the amplification circuit 83 and the imaging potential of plus 75 volts is applied to the control electrode 53 for 0.4 milliseconds. The amount of the toner particles 14 which pass through the aperture is perfectly controlled by the controlling of the imaging potential based on the three patterns described. The voltage applying times described above are not limited to the above mentioned values because the voltage applying time will vary according to such factors as the method of supplying the toner particle, the recording speed, the pitch of the control electrode provided on the modulating electrode member, the distance between the electrodes, and the amount of charging of the toner particle. However, the basic relationships pertain even though the actual values change. When the image recording medium P is inserted from the sheet inlet 21 into the device, it is fed to the back electrode roller 6 by the pair of guide rollers 23,23. A voltage of plus 1 kilovolts is applied to the back electrode roller 6 by the power supply 7. An electric field is formed by this applied voltage between the back electrode roller 6 and the modulating electrode member 1. Along the formed electric field, the toner particles 14, which have passed through the apertures 4 of the modulating electrode member 1, are attracted to the back electrode roller 6. The toner particles 14 are coated onto the fed image recording medium P and the toner particle image is formed on the image recording medium P by the sequential feeding of the image recording medium P.

Then, the image recording medium P is fed between the heat roller 24 and the press roller 25 and the toner particle image, formed on the image recording medium P, is thermally fixed thereon. The image recording medium P on which the toner particle image is thermally fixed is fed to the sheet outlet 22 and is discharged.

According to the embodiment described above, the amount of toner particles 14 that pass through the aperture can be perfectly controlled. As a result, an output image having an even density and one in which the density of the edge part is not emphasized can be produced.

Figure 5:
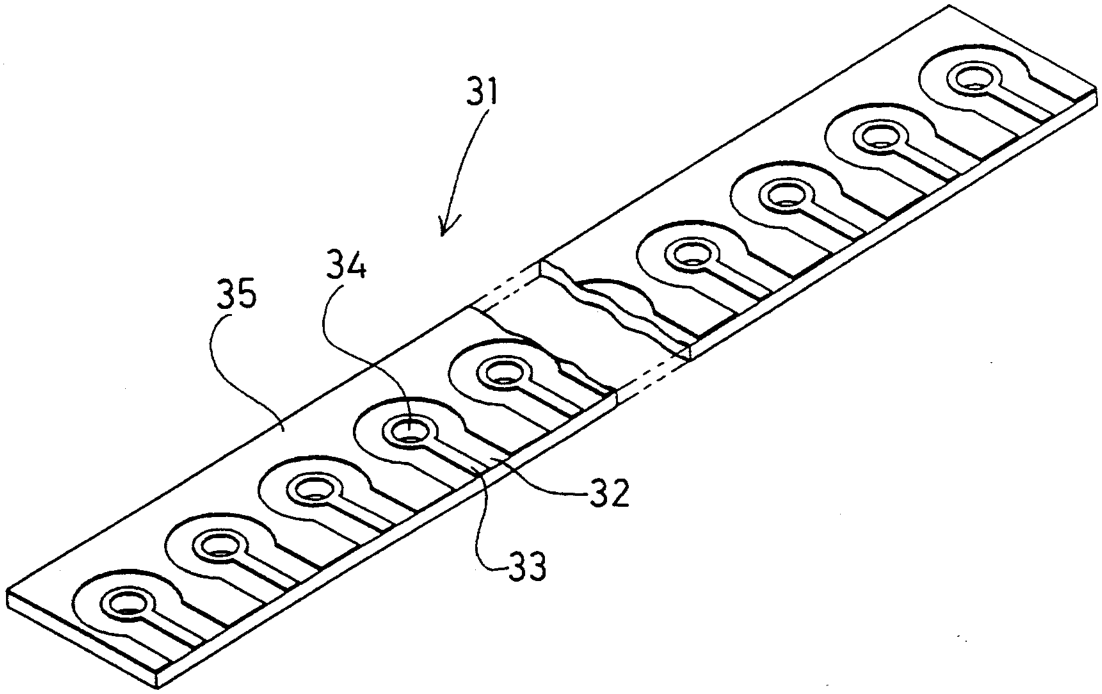
FIG. 5 is a perspective view showing a second embodiment of the aperture electrode, a modification of the first embodiment, used in the image forming apparatus of the invention.

Next, a second embodiment of the modulating electrode member, which can be used in the image forming apparatus of the invention, will be explained. As shown in FIG. 5, the modulating electrode member 31 comprises an insulative layer 32, a single array of apertures 34 provided on the insulative layer 32 so as to be spaced apart from each other, a plurality of control electrodes 33 provided so that a control electrode 33 surrounds each aperture 34 on one surface of the modulating electrode member 31, and a shield electrode 35 provided between each control electrode 33. The insulative layer 32 is also made of a resin film such as a polyimide having about 25 μm thickness. The control electrodes 33 and the shield electrode 35 are formed of a suitable electrically conductive material such as copper by a well-known spattering method. Each aperture 34 penetrates through the insulative layer 32 and has a diameter of 80 μm, which is preferable when recording of the image having a resolution of 300 dpi is requested.

As with the first embodiment, the charged toner particles 14 are given a negative polarity prior to being supplied to the apertures 34 of the modulating electrode member 31. Passage through the apertures 34, provided corresponding to the control electrodes 33, is controlled by the voltage applied from the control voltage applying circuit 9 to the control electrodes 33. The flow of the toner particles 14 that pass through an aperture 34 is not distorted by an electric field being formed between adjoining control electrodes 33 because the shield electrode 35 is provided between each control electrode 33 of the modulating electrode member 31.

According to this second embodiment, as explained above, an electric field is not formed between adjoining control electrodes 33 because the shield electrode 35 is provided between each of the control electrodes 33 of the modulating electrode member 31. As a result, when the modulating electrode member 31 thus structured is provided in the image forming apparatus, the flow of the toner particles 14 that have passed through the modulating electrode member 31 is not distorted and it is possible to produce a recording of the toner particle image that is faithful to the image data.

Figure 6:
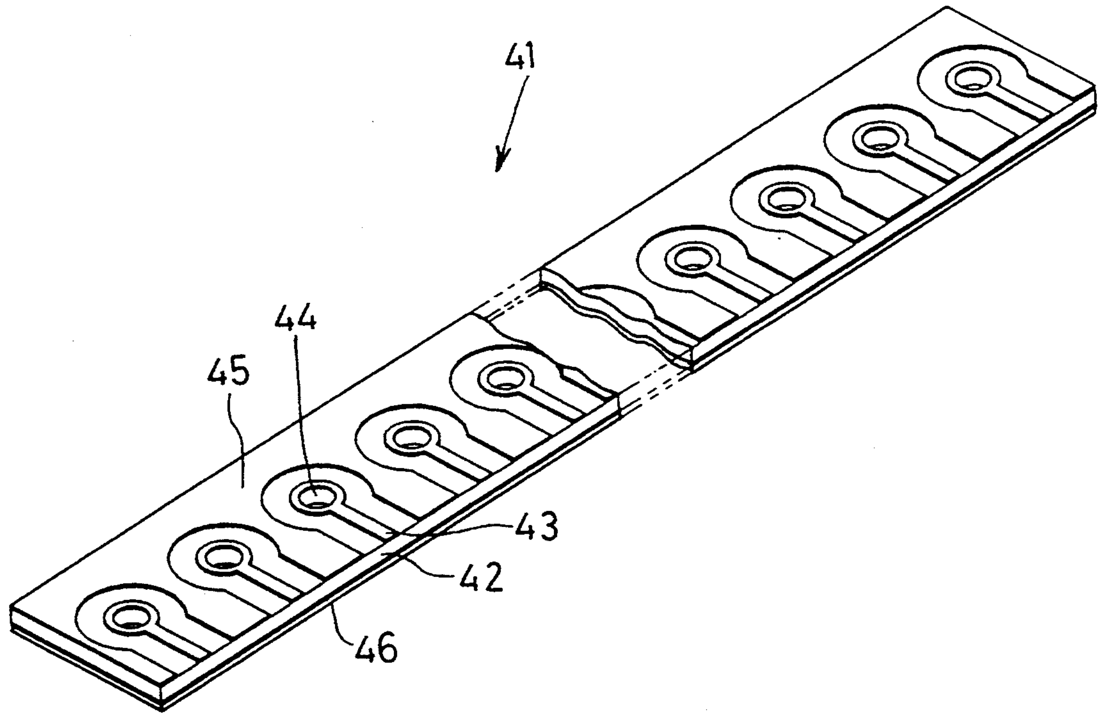
FIG. 6 is a perspective view showing a third embodiment of the aperture electrode, a second modification of the first embodiment, used in the image forming apparatus of the invention.

Further, as shown in FIG. 6, it is possible to use a modulating electrode member 41 on which a reference electrode 46 is formed on a side of the modulating electrode member 41 opposite to the side where the control electrodes 43 and shield electrode 45 are provided on the insulative layer 42 of modulating electrode member 41, as explained with respect to the second embodiment. The reference electrode 46 is grounded and an electric field can be generated between the grounded reference electrode 46 and the control electrode 43. The charged toner particles 14, having a negative polarity, either pass through or are prevented from passing through the apertures 44 by the electric field generated in accordance with the voltage applied from the control voltage applying circuit 9.

Figure 7:
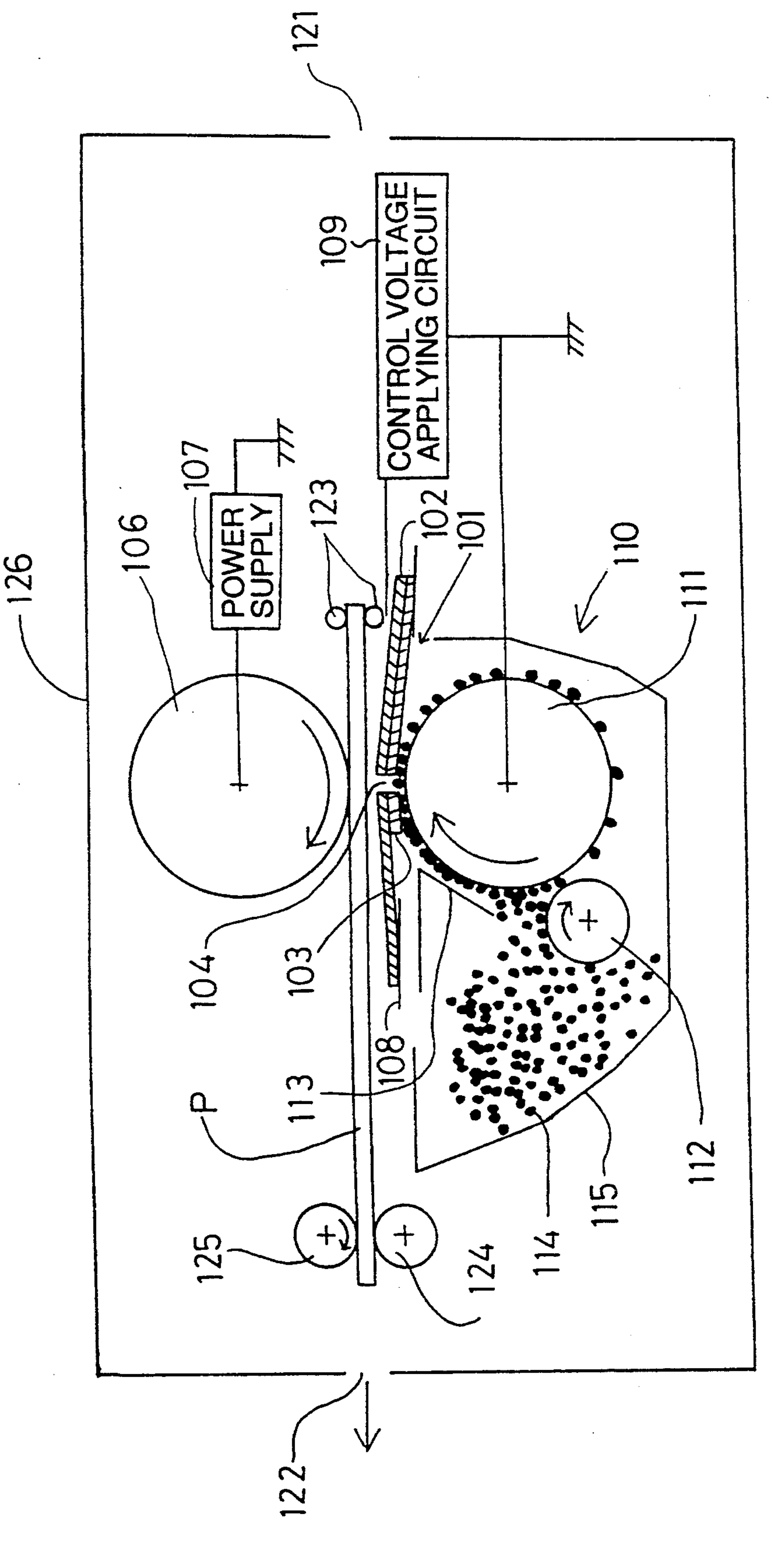
FIG. 7 is a fragmentary schematic view in elevation showing an image forming apparatus constructed according to a fourth embodiment of the invention.

Furthermore, in the present embodiment, the insulative layer side of the modulating electrode member 41 comes in contact with the toner particle carrying roller 11. However, as shown in FIG. 7, it is possible to arrange the side of a control electrode 103 of a modulating electrode member 101 so that it comes in contact with a toner particle carrying roller 111. At this time, the toner layer supported on the toner particle carrying roller 111 becomes an insulative layer. As such, the layer insulates between the modulating electrode member 101 and the toner particle carrying roller 111. According to such a structure, because the distance between the control electrode 103 and the toner particle carrying roller 111 is smaller, a stronger electric field can be generated by applying the voltage to the control electrode 103 and, thereby, the control of the flow of the toner particles 114 can be improved. In FIG. 7, elements 102, 104, 106–110, 112, 113, 115 and 121–126 correspond to elements 2, 4, 6–10, 12, 13, 15 and 21–26, respectively, as shown in FIG. 1. A description is omitted at this time for that reason.

It is to be understood that the invention is not restricted to the particular forms shown in the foregoing embodiments. Various modifications and alterations can be added thereto without departing from the scope and spirit of the invention encompassed by the appended claims.

For instance, it is possible to use a method such as voltage modulation which controls the amount of the applying voltage instead of the pulse width modulation which modulates the voltage applying time. In the voltage modulation, for example, a high imaging potential is applied to the control electrode A when the imaging potential is applied to both control electrodes adjoining the control electrode A and a low imaging potential is applied to the control electrode A when the non-imaging potential is applied to both control electrodes adjoining the control electrode A.

Further, it is possible to use a meshed wire as an electrode for the recording electrode instead of the modulating electrode member of the invention. At this time, it should be provided at least one shield wire between every other meshed wire.

Furthermore, it is possible to shield an electric field generated between each control electrode by driving every other electrode, that is, by applying 0 volts to every other electrode.

In the present embodiments, as a toner particle supplying means, a toner particle supply device of so-called one element system where the toner particle is charged by making the toner particles into a thin layer is used. However, various toner particle supply devices, such as a toner particle supply device of so-called two element system where a carrier is mixed with the toner particles can be used.

Moreover, in the present embodiments, the electrode for image recording is arranged to come into contact with the toner particle carrying roller. However, it is possible to arrange the electrode for image recording and the toner particle carrying roller with some space therebetween.

What is claimed is:

1. An image recording apparatus, comprising:

modulating electrode means having a plurality of apertures formed therethrough and a plurality of control electrodes corresponding to said apertures to which one of an imaging potential and a non-imaging potential is selectively applied for controlling passage of toner particles to the apertures;

toner particle supplying means for supplying charged toner particles to the apertures provided in said modulating electrode means;

back electrode means for supporting an image recording medium, said back electrode means being arranged on an opposite side of said modulating electrode means from said toner particle supplying means; and electric field control means for controlling a flow of toner particles from said toner particle supplying means to said image recording medium so as to become an appropriate flow, wherein said electric field control means includes control means for controllinq the imaging potential applied to the control electrodes corresponding to the apertures so that the waveform of the applied imaging potential may differ when the imaging potential is applied to the control electrode of an adjoining aperture and when the non-imaging potential is applied thereto.

2. The image recording apparatus according to claim 1, wherein said control means includes discriminate means for determining whether the imaging potential is applied to the control electrode of the adjoining aperture or the non-imaging potential is applied thereto.

3. The image recording apparatus according to claim 2, wherein said control means further includes on-time control means for controlling an applying time of the imaging potential according to the determination by said discriminate means.

4. The image recording apparatus according to claim 3, wherein the applying time of the imaging potential that is applied to one control electrode when the imaging potential is applied to one of its adjoining control electrodes and the non-imaging potential is applied to another adjoining control electrode is shorter than the applying time of the imaging potential applied to the one control electrode when the imaging potential is applied to both of its adjoining control electrodes.

5. The image recording apparatus according to claim 4, wherein the applying time of the imaging potential applied to the one control electrode when the imaging potential is applied to one of its adjoining control electrodes and the non-imaging potential is applied to the other adjoining control electrode is longer than the applying time of the imaging potential applied to the one control electrode when the non-imaging potential is applied to both of its adjoining control electrodes.

6. The image recording apparatus according to claim 3, wherein said control means includes amplification means for amplifying an output from said on-time control means to a desired control voltage.

7. The image recording apparatus according to claim 1, wherein said modulating electrode means has an insulative layer and said control electrodes are formed on said insulative layer.

8. The image recording apparatus according to claim 7, wherein said modulating electrode means has a reference electrode which is formed on a side of said insulative layer opposite to said control electrodes.

9. The image recording apparatus according to claim 7, wherein said modulating electrode means has a shield electrode between each of said control electrodes.

10. The image recording apparatus according to claim 1, wherein said modulating electrode means is arranged to be spaced from said toner particle supplying means.

11. An image recording apparatus, comprising:

modulating electrode means having a plurality of apertures formed therethrough and a plurality of control electrodes corresponding to said apertures to which one of an imaging potential and a non-imaging potential is selectively applied for controllinq passage of toner particles to the apertures;

toner particle supplying means for supplying charged toner particles to the apertures provided in said modulating electrode means;

back electrode means for supporting an image recording medium, said back electrode means being arranged on an opposite side of said modulating electrode means from said toner particle supplying means; and electric field control means for controlling a flow of toner particles from said toner particle supplying means to said image recording medium so as to become an appropriate flow, wherein said modulating electrode means comprises;

an insulative layer;

a single array of apertures provided in said insulative layer and being spaced apart from each other;

a plurality of control electrodes, a control electrode provided to surround each aperture; and a shield electrode provided between adjoining control electrodes.

12. The modulating electrode means according to claim 11, wherein said shield electrode is provided on a side of said modulating electrode means toward the image recording medium.

13. The image recording apparatus according to claim 11, wherein said shield electrode is formed of a suitable electrically conductive material such as copper.

14. The image recording apparatus according to claim 11, further comprising a reference electrode which is formed on an opposite side of said insulative layer from said control electrode.

15. An image recording apparatus, comprising:

modulating electrode means having a plurality of apertures formed therethrough and a plurality of control electrodes corresponding to said apertures to which one of an imaging potential and a non-imaging potential is selectively applied for controlling passage of toner particles to the apertures;

toner particle supplying means for supplying charged toner particles to the apertures provided in said modulating electrode means;

back electrode means for supporting an image recording medium, said back electrode means being arranged on an opposite side of said modulating electrode means from said toner particle supplying means; and electric field control means for controlling a flow of toner particles from said toner particle supplying means to said image recording medium so as to become an appropriate flow, wherein said toner particle supplying means includes toner particle supporting means for supporting the toner particles and said modulating electrode means comes into contact with said toner particle supporting means at least in the vicinity of the apertures provided in said modulating electrode means with a toner particle layer therebetween.

16. The image recording apparatus according to claim 15, wherein said modulating electrode means has an insulative layer that comes into contact with the toner particle supporting means with the toner particle layer therebetween.

17. The image recording apparatus according to claim 15 wherein said control electrode of said modulating electrode means comes into contact with the toner particle supporting means with the toner particle layer therebetween.

18. The image recording apparatus according to claim 17, wherein said toner particles are a nonconductive material.

* * * * *